Feb. 17, 1925.
G. A. ENGLUND
CENTER REST
Filed Feb. 12, 1924
1,526,329
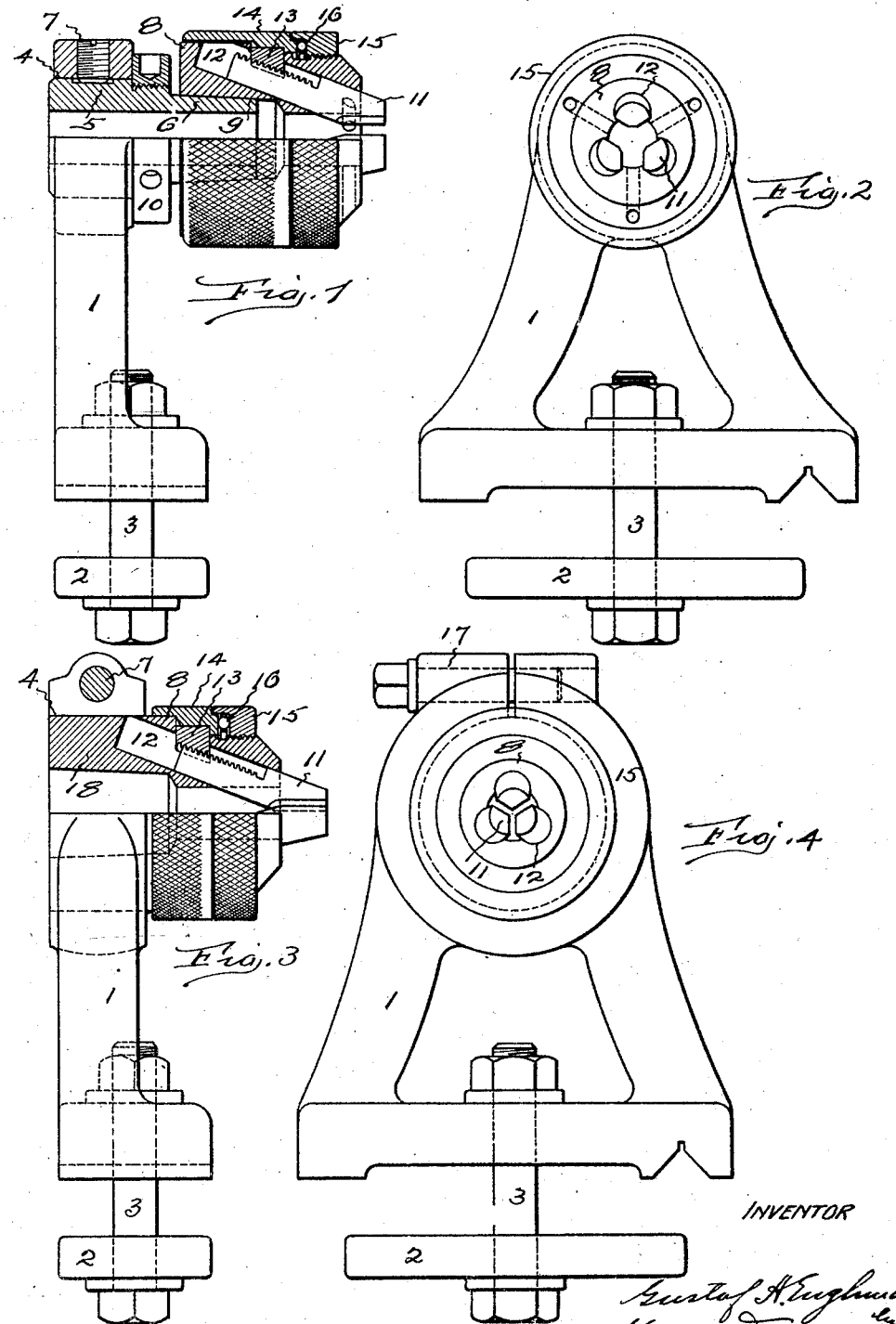
INVENTOR Patented Feb. 17, 1925.

1,526,329

UNITED STATES PATENT OFFICE.

GUSTAF A. ENGLUND, OF WEST HARTFORD, CONNECTICUT, ASSIGNOR TO THE JACOBS MANUFACTURING COMPANY, OF HARTFORD, CONNECTICUT, A CORPORATION OF CONNECTICUT.

CENTER REST.

Application filed February 12, 1924. Serial No. 692,243.

*To all whom it may concern:*

Be it known that I, GUSTAF A. ENGLUND, a citizen of the United States, residing at West Hartford, in the county of Hartford and State of Connecticut, have invented a new and useful Improvement in Center Rests, of which the following is a specification.

This invention relates to those devices which are applied to lathes, grinders, drill presses, milling machines and the like machine tools for supporting and retaining axially central the pieces of work which are to be operated upon.

The object of the invention is to produce a simple, quickly manipulated and accurate universal center rest, that is, a center rest that can be substituted on machines of the class mentioned in place of those commonly used, which rest has a wide range and can be quickly adjusted to support and hold centrally pieces of metal of any diameter within the scope of the device.

This object is attained by providing a supporting frame or block adapted to be fastened to the machine bed or frame in the usual way. This block has near its upper end a bore the axis of which is in exact alignment with the axis of the work spindle of the machine with which it is to be used. A body is shaped to be fastened in, or applied to a part that is fastened in, said bore, which body contains radially adjustable jaws, and has means for adjusting the jaws to enlarge or contract the space between them, and means for locking the jaws in any position to which they are adjusted.

In the accompanying drawings Fig. 1 shows a side elevation with parts cut in central longitudinal section of a center rest that embodies the invention. Fig. 2 is a face view of the same. Fig. 3 shows a side elevation with parts in section of a center rest of modified construction. Fig. 4 is a face view of the modified form.

The supporting block 1 which is illustrated is adapted to be located on the top of the bed of a lathe or other machine and be fastened in place by a clamp plate 2 and bolt 3 in the customary manner. Near the upper end of the block is a bore 4 the axis of which is designed to be in line with the axis of the tool spindle, chuck or centers of the machine to which the block is to be applied.

In the form first illustrated a sleeve 5 that has a tapering hub 6 is fitted within the bore at the top of the block. A set screw 7 is threaded through the end of the block against the sleeve for securing it in place. The body 8 has a tapering opening 9 and is driven on the tapered hub of the sleeve that is secured in the top of the block. A nut 10 may be threaded on the sleeve in position to be turned against the back of the body in order to quickly force the body from the hub should it become set so tightly that it could not be otherwise easily removed. The centering jaws 11 are movably located in inclined sockets 12 in the body. The backs of these jaws are threaded and engaged with these threads are threads in the interior of a ring 13 which is rotatable on but has no longitudinal movement along the body. On the exterior of the body and attached to the ring is a rotatable sleeve 14. Upon turning this sleeve the ring is rotated and this through the threads draws in or pushes out the jaws and enlarges or contracts the opening between the jaws according to the direction of rotation of the sleeve. Threaded on the body in front of the sleeve is a nut 15. Between this nut and the end of the body may be anti-friction balls 16. When the nut is turned off, the sleeve is free to be rotated for adjusting the jaws, but when the nut is turned up the sleeve is clamped and the jaws are locked in the position to which they have been adjusted.

In the second form illustrated the jaws are adjusted and locked in the manner above described, but in this arrangement the upper end of the supporting block is split to the bore and provided with a clamp screw 17. In this form an extension 18 of the body is fitted into the bore when the screw is turned out, and is then clamped in place by turning in the screw.

There can be any desired number of jaws made of any suitable metal and they may be opened and closed by any of the well known and commonly employed means. In use the jaws are adjusted to a running fit on the work and the lock nut is turned against the adjusting means. This center rest is especially suitable for small work as it can be adjusted finely and is quickly operated. It may be used not only to sustain a piece of work while being cut, but can be employed for centering a piece of work that has not been previously centered, between the head and tail stocks of a lathe, or between the live and dead spindles of a machine. By employing this invention centering means of any size may be quickly secured to the supporting block, which means will be perfectly centered and remain so, permitting the block to be removed from the machine and then again applied thereto. All that is necessary is to locate and clamp the block to the frame or bed of the machine, adjust the jaws to a running fit on the piece of work, and then turn up the lock nut so as to hold the jaws. This center rest can also be applied to the tail stock or mounted on a following rest of a lathe carriage.

The invention claimed is:—

1. A center rest comprising a supporting block, a body with an axial opening detachably secured to said block, jaws movable in said body obliquely to the axis of the opening, rotatable means encircling the body for adjusting the jaws to enlarge or decrease the space between them, and rotatable means encircling the body and engaging said adjusting means for locking the jaws in adjusted position.

2. A center rest comprising a supporting block, a body with an axial opening supported by said block, jaws movable in said body obliquely to the axis of the opening, a sleeve encircling and rotatable on the body for adjusting the jaws to enlarge or decrease the space between them, and a threaded ring encircling and rotatable on the body and adapted to clamp the sleeve for locking the jaws in adjusted position.

3. A center rest comprising a supporting block, a tubular hub clamped to said block, a body with an axial opening mounted on said hub, jaws movable in said body obliquely to the axis of the opening, a sleeve encircling the body and connected with the jaws for adjusting the jaws to enlarge or decrease the space between them, and means for clamping said sleeve against rotation and thus locking the jaws in adjusted position.

4. A center rest comprising a supporting block, a hub clamped to said block, a body mounted on said hub, means mounted on said hub for forcing the body therefrom, jaws movable in said body, means for adjusting the jaws to enlarge or decrease the space between them, and means for locking the jaws in adjusted position.

5. A center rest comprising a supporting block, a body with an axial opening supported by said block, jaws movable in said body obliquely to the axis of the opening, rotatable means encircling the jaws and body for adjusting the jaws axially to enlarge or decrease the space between them, and means encircling the body adapted to clamp said adjusting means and lock the jaws in adjusted position.

6. A center rest comprising a supporting block, a tapered hub clamped to said block, a body mounted on said hub, a nut threaded on said hub for forcing the body therefrom, jaws movable in said body, means for adjusting the jaws to enlarge or decrease the space between them, and means for locking the jaws in adjusted position.

7. A center rest comprising a supporting block, a body with an axial opening mounted on said block, jaws movable in said body obliquely to the axis of the opening, a sleeve rotatable but axially immovable on the body for adjusting the jaws to enlarge or decrease the space between them, and a nut threaded on the body and adapted to clamp said sleeve against rotatable movement and thus lock the jaws in adjusted position.

8. A center rest comprising a supporting block with a cylindrical bore, a body with an axial opening and having a part clamped in said bore, jaws movable in said body obliquely to the axis of the opening, a rotatable threaded ring engaging the jaws, a rotatable but axially immovable sleeve attached to said ring, and a nut threaded on the body and adapted to clamp the sleeve and cause it to hold the ring so as to lock the jaws in adjusted position.

GUSTAF A. ENGLUND.